Jan. 1, 1963 W. M. NELLIS ET AL 3,071,774

MAGNETIC RECORDERS

Filed Aug. 7, 1959

INVENTORS
WILLIAM MERTON NELLIS
GLENN M. STOUT
BY Carlsen & Hagle
ATTORNEYS

United States Patent Office 3,071,774

Patented Jan. 1, 1963

3,071,774
MAGNETIC RECORDERS

William Merton Nellis, Maplewood, and Glenn M. Stout, Golden Valley, Minn., assignors, by mesne assignments, to Standard Conveyor Company, St. Paul, Minn., a corporation of Minnesota Filed Aug. 7, 1959, Ser. No. 832,194
4 Claims. (Cl. 346—74)

This invention relates to devices for recording digital signals on magnetizable records, and more specifically to simplified head constructions and electrical circuits therefor.

This invention is particularly useful in recording binary signals on a magnetizable record spaced about-one-fourth inch or more from the pole pieces and subject to uncontrollable movements in a direction other than normal record travel direction. A first embodiment of the invention recorded on a tubular record having magnetizable elements in the form of ferromagnetic bars exhibiting rectangular hysteresis characteristics along a preferred magnetization axis. The tubular record had a minimum axial length for the number of axially spaced record elements; therefore the recording heads must provide good magnetic isolation between axially adjacent elements while providing a strong fringing flux pattern.

Accordingly it is an object of this invention to provide a magnetic head structure for effectively simultaneously recording a plurality of digital signals and in which adjacently disposed winding means share a common pole piece and a common shunt without interacting flux.

It is another object of this invention to provide a magnetic head having parallel flux directing bands each magnetically coupled to adjacent record elements and intercoupled by winding means covering only a small portion of the bands and operative to record signals on a record element randomly disposed along said bands with respect to the winding means.

It is still another object of this invention to provide an improved annular magnetic recorder for recording a plurality of digital signals along an axis of a cylindrical record disposed radially inwardly from the pole pieces and randomly circumferentially located with respect thereto.

These and other more detailed and specific objects will be disclosed in the course of the following specification, reference being had to the accompanying drawing, in which—

Figures 1, 2, 3:
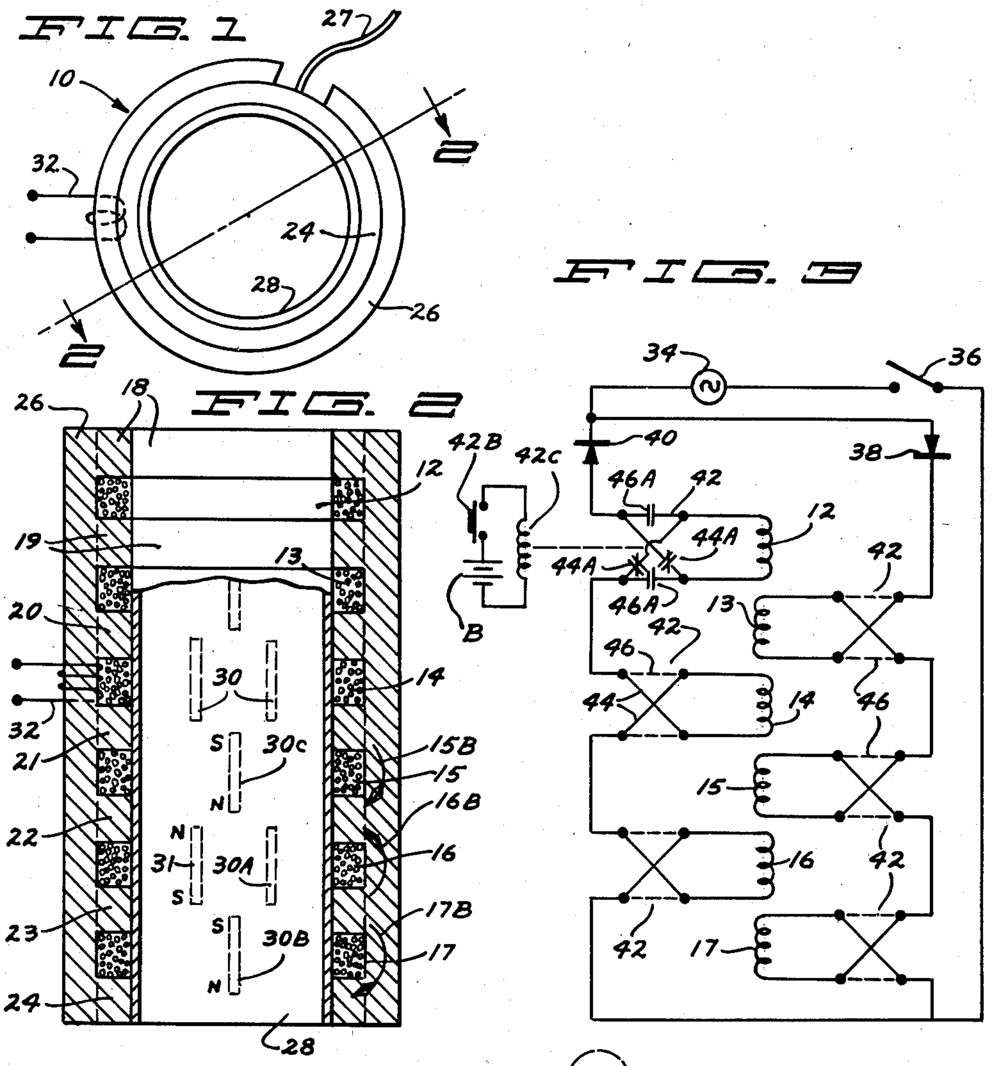
FIG. 1 is an inverted plan view of a preferred embodiment of the present invention.
FIG. 2 is a vertical sectional view taken along lines 2—2 of FIG. 1.
FIG. 3 is a schematic diagram of preferred circuitry for operating the FIGS. 1 and 2 head as a magnetic recorder.

With particular reference now to the accompanying drawing like numerals denote like parts and structural features in the various views and schematic diagram. In FIGS. 1 and 2 there is shown a tubular magnetic head 10 having a plurality of annular windings 12 through 17, inclusive, respectively disposed between but not encircling a plurality of annular like dimensioned pole pieces 18 through 24, inclusive. A permeable shunt 26 is disposed radially outwardly of and in magnetic circuit relation to all of the pole pieces with an axially extending space for permitting the leads 27 from all the windings to be brought out for connection to electrical circuitry as will become apparent. Shunt 26 may be integrally formed with all of the pole pieces 18 through 24 or may be a separate magnetic structure contiguous therewith.

Non-magnetic tubular shield 28 is disposed radially inwardly of the windings and pole pieces, preferably flush against the pole piece faces as shown in FIG. 2. The bar shaped ferro-magnetic record elements 30 within the shield 28 each have rectangular hysteresis characteristic along a preferred magnetization axis and are supported on a non-magnetic substrate (not shown). The elements 30 are arranged in axially spaced apart annular or circumferential rows, such as the rows 30A, 30B and 30C. Every element in each row preferably records the same signal for providing one binary digit storage capacity in each element row.

To record signals on or reproduce signals from the elements 30, each annular or circumferential row of elements are placed opposite the windings with the upper and lower element ends, as viewed in FIG. 2, respectively magnetically coupled to adjacent pole pieces. For example, the elements in the row 30A have their respective upper ends magnetically coupled to the pole piece 22 and their respective lower ends to the pole piece 23. The other element rows are located in a like manner with respect to other windings and pole pieces. By causing suitable currents to flow through the respective windings the resulting magnetic flux causes the elements 30 to be magnetized in one of two magnetic states or directions of residual magnetization capable of indicating a binary code digit. The recorded signals are reproduced by sensing the voltages induced in the respective windings by the residual magnetizations. Alternately the winding 32 is provided about a shunt 26 portion between the pole pieces coupled to one row of elements 30. The operation of the winding 32 will be later described with reference to FIG. 4.

In using the just described head with series connected windings to record a plurality of digits on a tubular record medium, a phenomenon occurred which caused some elements in a row to have residual magnetizations in different directions. This was found to occur when three adjacent windings, such as the windings 15, 16 and 17 in FIG. 2, respectively were to record in alternate magnetization directions, providing a 101 or 010 binary code pattern. The record on which the tests were conducted had six record elements in each circumferential row with the elements in adjacent rows being staggered as indicated in the drawing. In the row 30A for example, when a binary one signal was recorded therein with binary zeros in rows 30B and 30C, it was found that at least three of the row 30A elements recorded binary ones; however one element in the row 30A diametrically opposite the center one of the three elements had a binary zero recorded therein and was flanked by the remaining two elements whose magnetization appeared to be of an unusual character. The flanking elements did not appear to be magnetized along the preferred magnetization axis. In fact, when the flanking elements remained in the tubular record, the exact magnetization direction was not determined by using a magnetic compass in an attempt to find the magnetic poles. These results did not appear to be related to any particular record element nor to any particular circumferential spot on the recorder utilized for the tests.

The causes of the above results are not known, but it is believed to be related to two adjacent windings sharing a common pole piece since this phenomenon was successfully avoided by energizing adjacent windings at different times as will be fully described.

In the tests conducted with regard to the described phenomenon the windings 15, 16 and 17 were respectively connected to provide binary 101 indicating flux vectors 15B, 16B and 17B in the toroidal shaped magnetic recording circuits including the elements 30. The correct residual magnetization in the elements 30 from the illustrated flux vectors is indicated on the elements by N and S, respectively for the north and south magnetic poles. However, the element 31 in the row 30A apparently became subjected to the windings 15 and 17 magnetic field causing the residual magnetization direction in that one element to be reversed from the magnetization directions of the other row 30A elements and from the illustrated direction.

While the precise cause for the reversal in the element 31 was not determined, it is believed that the adjacent fields indicated by 15B and 17B "punctured" the 16B field providing flux in the element 31 opposite to the desired flux. It was noted that when winding 16 was not energized that simultaneous energization of the windings 15 and 17 did not give rise to the unusual magnetization reversal of the element 31.

The so-called puncture is believed caused in part by the saturation and resulting partial blocking of flux in the shared pole pieces 2 and 23. The flux caused by both adjacent windings flows radially inward in pole 22 and radially outward in the pole 23. If the poles are saturated the magnetic fields from windings 15 and 17 cooperate to find a path of less reluctance than the normal toroidal magnetic circuit in which the shared poles are presenting increased opposition to flux. The magnetic element 31 being highly permeable, even though being subjected to an opposing field 16B, can provide such a low reluctance path. The elements flanking the element 31 in the row 30A may have the unusual magnetic characteristics due to the reversal of magnetic fields in the circumferential direction, i.e., between the winding 15—17 "puncture" field and the winding 16 field.

The present invention circumvents the above described problems by utilizing the circuit of FIG. 3 to alternately energize adjacent windings. An alternating current source 34 which may be a 60 cycle power device, is time limitedly connected across the recording windings by a switch 36. The so-called positive going half electrical cycles were applied across the odd numbered windings and the negative going half-cycles were applied across the even numbered windings respectively through the unidirectional current conducting devices 38 and 40. The even and odd numbered windings axially alternately disposed in the head 10 are respectively series connected to provide a uniform magnetizing current therethrough. In testing the latter circuit with the same apparatus as was used to conduct the previously described tests, ten alternating current cycles were utilized to reliably record the digital signals on the elements 30 at a radially inward spacing from the pole pieces of greater than one-fourth inch. It is seen that the simple circuit provides time sharing of the common pole pieces of adjacent windings, yet effectively provides simultaneous recording by splitting the power cycle into two parts.

Four-way switching elements 42 connect the windings into the respective series circuits and are utilized to provide binary flux patterns in each winding. Each of the elements 42 has two switching connections, a first indicated by the solid lines 44 indicative of normally closed contacts 44A which diagonally connect the illustrated switch terminals. The other connection consists of a set of normally open contacts 46A indicated by the dotted lines 46 in which the upper and lower terminals as viewed in FIG. 3 are respectively connected together. A switch 42B may connect battery B to a coil 42C for moving the contacts. The effect of changing the switching connection on any one winding is to reverse the current therethrough without affecting the series circuit and thus provide selective flux patterns in the head. The just described circuit provides a maximum flux in adjacent windings respectively 180 electrical degrees out of phase avoiding the undesired magnetization patterns heretofore discussed and yet effectively providing simultaneous recording in all elements.

The just described embodiment is preferred for recording on a record having a plurality of record elements receiving the same recording signal from the same pair of pole pieces. By providing the annular winding a symmetrical flux is provided about the tubular record regardless of differences in element switching times. For example, the elements 30 circumferentially spaced apart along the poles 20 and 21 are at different distances from the winding 32. Any of the latter elements 30 completely switching magnetization directions before the more remote elements switch will divert the applied winding 32 switching flux from those elements, resulting in incomplete switching or partial magnetization of those elements. If one record element 30 is provided per row of elements than the energizing of the winding 32 could provide satisfactory magnetization results.

Figure 4:
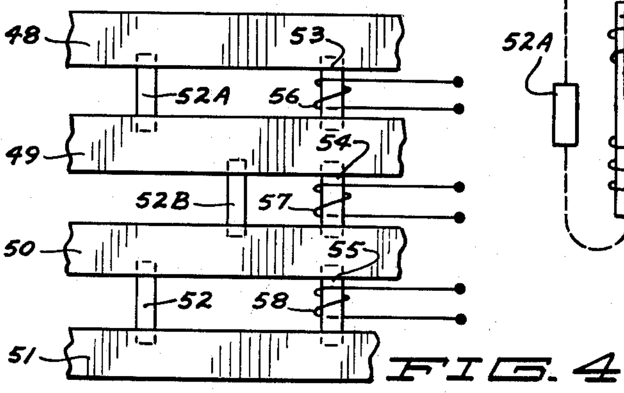
FIG. 4 is a diagrammatic showing of an alternate manner of constructing a recording head according to the present invention.

An alternate recording head is shown in FIG. 4 wherein a plurality of parallel spaced apart pole pieces or flux diverting and directing bands 48, 49, 50 and 51 extend transversely to the record medium direction of motion indicated by the long dimension of the record elements 50. As in the previously described embodiment the bands or pole pieces are respectively magnetically coupled to one end of a bar shaped record elements 52 in the read or record position; one band being coupled to two rows of record elements as band 49 is coupled to the lower ends of row 52A and the upper ends of row 52B elements. The magnetic circuits for the illustrated three rows of elements 52A, 52B and 52C are respectively completed by low reluctance shunts 53, 54 and 55 extending between adjacent bands. The location of any record element with respect to the narrow shunts and the windings 56, 57 and 58 thereon can be random along the length of the bands; the bands carrying the flux between the shunts and the elements. By making the bands annular, as are the head 10 pole pieces, a tubular magnetic recorder is provided. It may be noted that only one element per row of elements is preferred for use with this recorder because of the possibility of partial magnetization of some elements. As in the first embodiment, adjacent recording windings are alternately energized at least when each element row has a plurality of elements giving rise to the unusual previously described phenomenon.

In reproducing signals each band 48 through 51 need only extend circumferentially along each element row sufficient to magnetically link two elements on a randomly rotating tubular record medium.

The latter described embodiment in effect divert the fringing flux from the elements to the winding supporting magnetic shunts. With the windings merely being wound about the respective shunts, a compact reproducing head is provided with a minimum of wire used and permitting the facile use of the flux gate type of reading circuit as will become apparent. A flux gate reading circuit permits recording and reproducing signals regardless of the record element motion with respect to the flux diverting bands; the only important relationship is that of position of the elements adjoining two adjacent bands or two bands spaced apart to sense the magnetization in the element.

Figure 5:
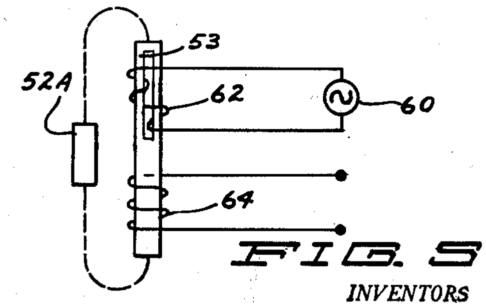
FIG. 5 is a schematic drawing of a reading device shown in energy transferring relationship to a record element.

With reference now to FIG. 5 a static reading circuit of the flux gate magnetometer type is described. A magnetic element of row 52A has its external magnetic field, as indicated by the dotted lines, linking a permeable bar shaped magnetic member 53 to cause a static magnetic bias therein in one of two directions. An alternating current source 60 provides a uniformly constructed signal to opposingly wound input winding 62; each winding portion wound opposite to the other portion for inducing no net flux in the long direction of member 53 and thus no voltage in a sense winding 64 wound thereabouts. The member 53 is slotted in the long direction with a winding portion being respectively wound about each formed leg and the sense winding being wound over the drive windings. The sense winding is shown displaced from windings 62 for clarity. Upon alternatively energizing the input winding the member 53 in the slotted region is alternately saturated to alternately force the element magnetic bias outwardly of the member and link the sense winding. The phase of the induced sense winding signal with respect to the drive current phase is indicative of the direction of residual magnetization in the element.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A magnetic recorder for recording a plurality of signals on a tubular record carrier having record elements on its outer periphery, comprising a plurality of annular parallel axially spaced apart pole pieces having rectangular circumferential cross-sections and disposed about a common axis for receiving a tubular record along said axis, a common magnetic shunt extending substantially the circumference of each pole piece and transversely across all pole pieces in contiguous radially outward relation thereto, a plurality of annular independent windings disposed between adjacent pole pieces and within said shunt, a non-magnetic tubular shield disposed in contiguous relation within said pole pieces and the windings, separate means connected across each winding for selectively reversing any current flowing therethrough to provide binary indicating current, axially alternate windings being series connected through said means forming two independent series circuits, rectifying means for passing only negative going and only positive going electrical currents therethrough, and an alternating current source connected across both of said series connected circuits respectively through said rectifying means.

2. A magnetic recorder for recording digital signals on a tubular magnetic record having magnetizable elements arranged in axial columns and circumferential rows with each row being for recording one digital signal, comprising a plurality of annular parallel axially spaced apart pole pieces disposed about a common axis for receiving a tubular record, a common magnetic shunt in magnetic circuit relation to all pole pieces, a plurality of windings each disposed in magnetic circuit relation to two pole pieces and each magnetically sharing one pole piece with a different winding, separate means associated with each winding for controlling the direction of current flow therethrough, one element in each row of elements being subject to be reversely magnetized with respect to other elements in the row at least when the adjacent rows are having digital signals of opposing polarity recorded therein, and recording signal generating means operative to provide signals to adjacent windings in a phase and time difference wherein the shared pole pieces magnetically coupled to the one element have a total flux less than saturation magnetization.

3. Apparatus as in the claim 2 wherein the generating means is an alternating current generator with oppositely poled rectifying means providing oppositely going half current cycles to adjacent windings.

4. Apparatus as in the claim 3 wherein axial alternate windings are respectively coupled in series circuit to said oppositely poled rectifying means.

References Cited in the file of this patent

UNITED STATES PATENTS

| | | |
|---|---|---|
| 2,835,743 | Muffley | May 20, 1958 |
| 2,875,429 | Quade | Feb. 24, 1959 |
| 2,915,597 | Wanlass et al. | Dec. 1, 1959 |
| 2,969,527 | Tung Chang Chen | Jan. 24, 1961 |
| 3,012,232 | Eckert et al. | Dec. 5, 1961 |

FOREIGN PATENTS

| | | |
|---|---|---|
| 804,735 | Great Britain | Nov. 19, 1958 |
| 1,181,257 | France | Jan. 5, 1959 |